United States Patent [19]

Smith et al.

[11] Patent Number: 4,865,258
[45] Date of Patent: Sep. 12, 1989

[54] QUICK RELEASE PEPPERMILL GRINDER ASSEMBLY

[75] Inventors: George S. Smith, Litchfield, Conn.; David C. Crocker, Hampden, Me.

[73] Assignee: Banton, Inc., Newport, Me.

[21] Appl. No.: 260,182

[22] Filed: Oct. 19, 1988

[51] Int. Cl.⁴ .............................................. A47J 42/04
[52] U.S. Cl. .................................. 241/169.1; 241/258
[58] Field of Search ...................... 241/168, 169.1, 169, 241/285 R, 248, 258, 259.1, 261.1

[56] References Cited

U.S. PATENT DOCUMENTS

| | | | |
|---|---|---|---|
| 2,407,808 | 9/1946 | Bivans | 241/169.1 X |
| 2,479,151 | 8/1949 | Bostick | 241/169.1 |
| 2,974,887 | 3/1961 | Grandinetti | 241/168 X |
| 4,685,627 | 8/1987 | Lee | 241/169.1 |

FOREIGN PATENT DOCUMENTS

| | | | |
|---|---|---|---|
| 2622143 | 12/1977 | Fed. Rep. of Germany | 241/169.1 |
| 2818216 | 11/1978 | Fed. Rep. of Germany | 241/169.1 |
| 2499840 | 8/1982 | France | 241/169.1 |
| 2604348 | 4/1988 | France | 241/169.1 |

*Primary Examiner*—Mark Rosenbaum
*Attorney, Agent, or Firm*—Daniel H. Kane, Jr.

[57] ABSTRACT

A quick release grinding assembly is incorporated in a condiment grinder mill. A base receives and stores condiment pieces such as peppercorns. A head is mounted on the base for rotation relative to the base. An elongate shaft extends through the head and base and the shaft is secured to the head for rotation relative to the base. The grinding mechanism includes a grinder cone attached to the end of the shaft and a grinder ring mounted in the end of the base. A support ring is formed with an outer perimeter or ring secured to the base and a flexing inner perimeter or ring of flexible deformable material receives and centers the shaft. The inner rim deformable material has an initial configuration and memory for return to the original configuration after flexing deformation. The shaft is formed with projecting ears arranged to be forcibly passable through the inner rim of the support ring by flexing deformation of the inner rim for quick release disassembly and assembly of the grinding mechanism. A captive spring secured coaxially on the shaft spring biases the shaft. Complementary locking surfaces on the shaft top nut and condiment grinder mill head are spring biased in locking engagement for manually turning the head, shaft and top nut in phase.

18 Claims, 2 Drawing Sheets

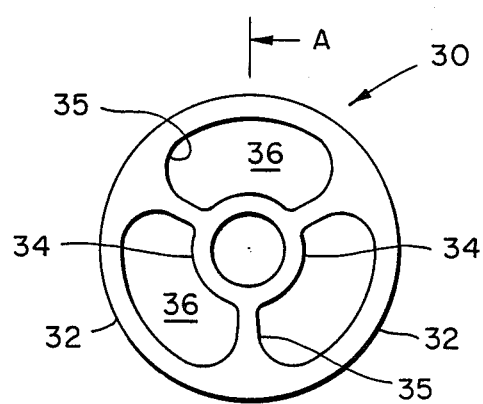
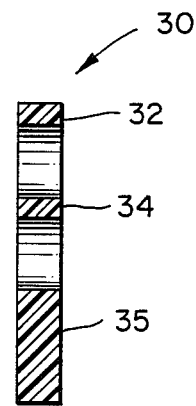
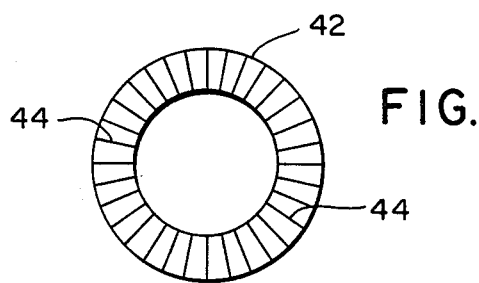
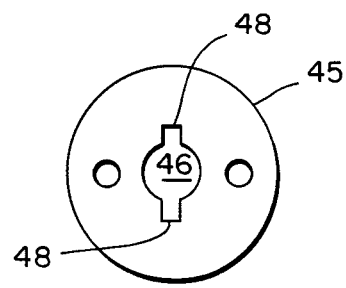
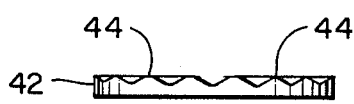

QUICK RELEASE PEPPERMILL GRINDER ASSEMBLY

TECHNICAL FIELD

This invention relates to condiment grinder mills such as peppermills and in particular to the grinder assembly for peppermills and similar condiment grinder mills. The invention provides a quick release assembly, spring loaded locking mechanism, and related features.

BACKGROUND ART

Pepper grinding mills and similar condiment grinders and dispensers are generally constructed with a base for receiving and storing condiment pieces such as peppercorns. A head is mounted on the base for manual rotation relative to the base. An elongate shaft extends through the head and base and the shaft is generally coupled to the head for rotation with the head relative to the base.

A first set of grinding teeth referred to herein as the grinder cone is secured to the bottom shaft and rotates with the shaft. A second set of grinding teeth referred to as the grinder ring is secured to the base at the bottom of the mill. The grinder cone and grinder ring are constructed and arranged to cooperate and form a grinding mechanism for grinding the peppercorns or other condiment pieces stored in the base and for discharging ground particles through the grinding mechanism.

The upper portion of the tapered grinder cone may be formed with larger helical grooves juxtaposed against large gripping teeth formed around the upper portion of the grinder ring for initially receiving and cracking or crushing the peppercorns or other condiment pieces. The grinder cone and ring are formed with finer grooves and teeth in the respective lower portions or levels for grinding the pieces into smaller particles for dispensing.

Another feature found in conventional peppermill grinders is a locating device or centering device which is used for centering the shaft when the head is removed to accept condiment pieces uniformly around the shaft. For example the Peugeot (TM) peppermill uses a formed wire clip for centering the shaft within the base of the mill. The Corona (TM) peppermill centering device is a plastic centering ring having an outer perimeter or rim seated against the base of the peppermill and an inner perimeter or rim for receiving and centering the shaft in the base. The inner & outer rims are joined by spokes or webs. The Borel (TM) peppermill also uses a centering ring of plastic material for the purpose only of radial centering of the shaft. A characteristic of each of these prior art peppermill grinding assemblies is that the mechanism is not easily disassembled for cleaning and tools are generally required for this purpose. Another disadvantage often encountered in conventional peppermills is slippage of the shaft top nut or knob relative to the head during grinding of peppercorns or other condiments changing the fine/coarse setting. Even the addition of a spring loaded shaft in the Chef Specialties (TM) peppermill does not in fact prevent the knob from becoming loose and out of adjustment.

OBJECTS OF THE INVENTION

It is therefore an object of the present invention to provide a new quick release peppermill or other condiment mill grinder assembly which may be easily disassembled or disengaged and reassembled for the purposes of cleaning etc.

Another object of the invention is to provide a grinder assembly for peppermilling and other condiment mills which avoids slippage between the shaft top nut and gripping head or rotating cap during grinding of condiment pieces.

DISCLOSURE OF THE INVENTION

In order to accomplish these results the present invention provides a centering device which also functions as a retaining ring or support ring for the shaft. The support ring is formed with an outer perimeter or rim secured to the base and a flexing inner perimeter or rim constructed of flexible deformable material. The inner and outer rims may be joined for example, by spokes or webs. The deformable material of the inner rim or perimeter is formed with an initial configuration for example conforming to the cross sectional configuration of the shaft and has a memory for substantial return of the inner rim to the original configuration after flexing deformation.

According to the invention the shaft is formed with projecting elements, lugs or ears extending beyond the width of the shaft. The overall span of the projecting tabs or ears is greater than the width of the flexing inner rim of the centering ring. The projections are constructed and arranged to be forcibly passable through the inner perimeter or rim of the centering ring by flexing deformation of the inner perimeter for releasibly assembling the shaft in the mill in an operating position. In the operating position the grinding cone and ring are in juxtaposition for grinding condiment pieces.

A feature and advantage of the invention is that the shaft and grinding cone are quickly releasable from the mill by forcibly passing the shaft projections back through the flexing inner perimeter or rim of the support ring. This is accomplished by unscrewing and releasing the top nut at the top of the shaft over the head or cap of the peppermill, removing the head and then pressing the shaft in a downward direction back through the support ring or retaining ring. No tools are required for this disassembly of the grinder assembly.

Another feature of the new grinding mechanism assembly is that if the top nut of the peppermill head or cap is removed, the shaft cannot slide out and fall from the mill. Rather, the shaft is loosely retained by the projecting ears or tabs resting on the inner rim of the support ring until the projecting ears are forcibly pushed through the deformable inner rim. Retaining screws and straps are no longer required.

The invention also provides a captive spring secured coaxially around the shaft between an upper washer slidable on the shaft and constrained by the shaft projections or projecting ears, and a lower stop secured on the shaft such as a retaining ring. The captive spring is positioned along the shaft so that the upper washer is pushed along the shaft by the inner perimeter of the support ring during assembly. The captive spring is thereby compressed and spring biases the shaft in a downward direction when the shaft is in the operating position in the mill. In this operating position, the grinder cone at the bottom of the shaft is retained in position against the grinder ring of the base for grinding and dispensing particles. This position is adjustable by the top nut for varying the displeased particle size from fine to coarse.

The top of the shaft projects above the head or cap of the grinding mill when the shaft is in operating position. A top nut is releasibly secured, for example by screw threads, to the top of the shaft. The top nut is formed with a first irregular undersurface for bearing against the head. The top nut is spring biased by the captive spring against the head for locking the shaft and head in phase during grinding operation and rotation of the head.

The top of the head is further formed and provided with a second irregular surface at the top facing the first irregular undersurface of the top nut. These first and second irregular surfaces are complementary for locking engagement. The captive spring mounted on the shaft biases the first and second irregular surfaces together when the shaft is in operating position for rotation of the shaft top nut and head in phase.

In the preferred embodiment the shaft is formed with swaged ears providing projections on either side of the shaft. The swaged ears are formed with curved outer surfaces for smoothly engaging and flexing the inner perimeter of the support ring for quick release, disassembly, and assembly of the grinding mechanism. The swaged ears are positioned at a location along the shaft so that the captive spring bears against the bottom of the inner rim of the support ring. In operating position the projection ears do not bear against the top side of the inner rim to prevent abrasion. However the projecting ears are close enough to the support ring so that when the top nut is released and the shaft is held in the mill by the projecting ears bearing against the inner rim, the spacing between the grinder cone and grinder ring is still small enough to retain condiment pieces stored in the base.

Other objects features and advantages of the invention are apparent in the following specification and accompanying drawings.

BRIEF DESCRIPTION OF THE DRAWINGS

FIG. 2 is a side view of the peppermill shaft showing the swaged ears forming projections at the sides of the shaft while

FIG. 3 is a plan view of the support ring or retaining ring while 3A is a side cross sectional view of the support ring in the direction of the arrows on the line A—A of FIG. 3.

FIG. 4 is a plan view of the lock ring forming the irregular surface at the top of the head or the cap of the peppermill while FIG. 4A is a side view of the lock ring.

FIG. 5 is a plan view of the keyed plate secured to the bottom of the head or cap of the peppermill providing key recesses or slots for the swaged ears of the shaft so that the shaft and head rotate in phase.

DESCRIPTION OF PREFERRED EXAMPLE EMBODIMENTS AND BEST MODE OF THE INVENTION

Figure 1:
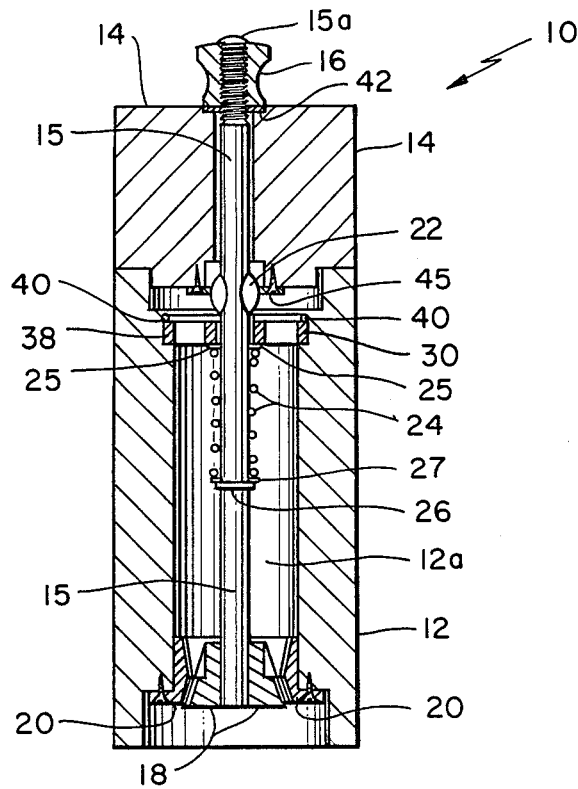
FIG. 1 is a diagrammatic side cross section through a peppermill according to the present invention showing the elements of the peppermill grinding assembly.
Figure 2:
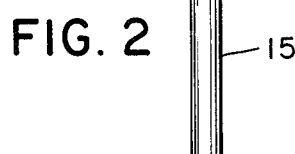
Figure 2A:
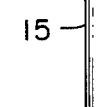
FIG. 2A is a plan view of the shaft and FIG. 2B is another side view of the shaft rotated at right angles to the position of FIG. 2.
Figure 2B:
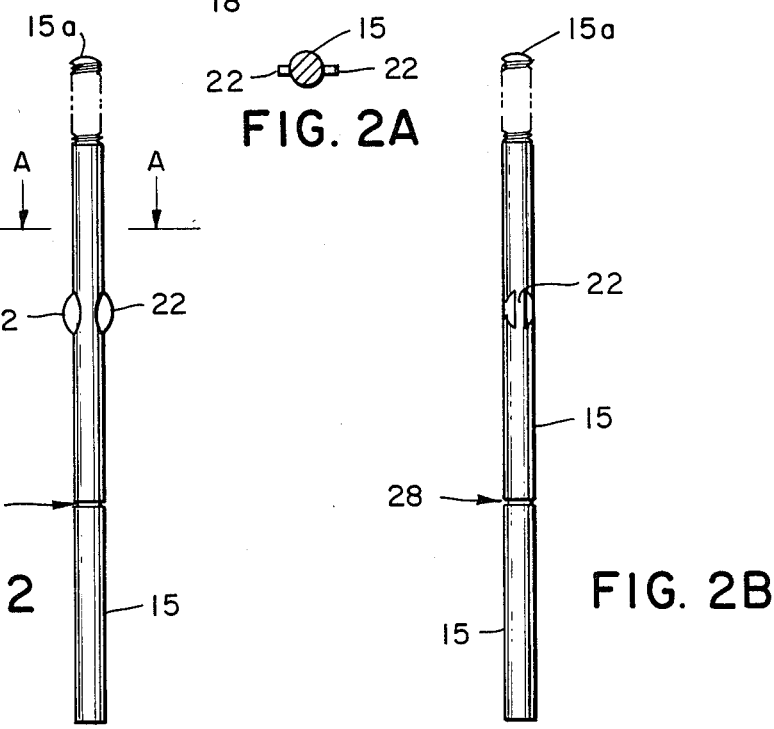

A peppermill or more generally a condiment grinder mill 10 according to the invention is illustrated in FIGS. 1 through 5. Referring in particular to FIG. 1 the peppermill 10 is composed of an elongate base 12 enclosing the storage spaced 12a for holding peppercorns or other condiment pieces for grinding andd dispensing. A head or cap 14 is mounted for rotation over the base 12. Elongate shaft or rod 15 extends through the head 14 and base 12. In operating position the top end 15a of the rod 15 extends above the head 14 of the peppermill when the rod or shaft is in operating position. The top end 15a is threaded and top nut 16 is releasibly secured to the top end 15a of the shaft 15. The particle size dispensed by the grinding mechanism may be adjusted by turning the top nut 16 and changing the depth position of top nut 16 on the top end 15a of the shaft.

As hereafter described the shaft 15 is secured or coupled to the head 14 manual rotation with the head of the peppermill. The grinder cone 18 is secured or fixed to the bottom of the shaft 15 for rotation with the shaft and forms one of the complementary elements of the grinding mechanism. The grinder ring 20 having an inner surface with a truncated conical annular configuration is secured to the base 12 near the bottom of the base. The grinder cone 18 and grinder ring 20 are constructed and arranged to form the grinding mechanism for grinding peppercorns of other condiment pieces held in the storage space 12a inside the base 12.

As shown in FIGS. 1, 2, 2A, & 2B the rod or shaft 15 is formed with swaged ears which form projecting elements extending on either side of the rod 15 beyond the diameter of the rod. The projecting elements or swaged ears 22 are positioned on the rod at a functional location as hereafter described.

Mounted coaxially and "captive" on the shaft 15 is an elongate spring 24. The spring 24 is secured on the shaft 15 between an upper washer 25 which is slidable on the shaft 15 and a lower washer 27 and snap ring 26 which is held in a circular groove 28 of the shaft 15 to form a lower stop.

The centering device for the peppermill is a support ring 30 illustrated in FIGS. 1, 3 & 3A. The support ring 30 is formed with an outer perimeter or rim 32 which is seated against the inner wall of the base 12 and an inner perimeter or rim 34. The inner and outer rims are joined by spokes or webs 35 leaving openings 36 for filling the storage space 12a in the base 12 with peppercorns or other condiment pieces after the head 14 is removed.

According to the invention the inner rim 34 and generally also the supporting webs 35 are constructed of a flexible deformable material such as polypropylene or polyethylene having the initial configuration of the rim 34 as illustrated in FIG. 3 and a memory for substantial return of the inner rim to this original configuration after flexing deformation.

The retaining support ring 30 is seated in a stepped groove formed in the side wall of the base 12 and is retained on the lower side by the groove step 38. On the upper side the support ring 30 is held in place by a spring wire 40 seated in a further undercut groove above the support ring stepped groove as shown in FIG. 1. The retaining spring wire 40 and groove step 38 hold the support ring in place during passage of the swaged ears 22 through the support ring flexibly deforming the inner rim 34 of the support ring during assembly and disassembly.

Referring to FIGS. 1, 4 and 4A, the bottom or under surface of the top nut 16 is formed with relief in the form of radial ribs as shown in FIGS. 4 and 4A. In this regard, FIG. 4 may be considered to represent a plan view of the under surface of top nut 16. A complementary lock ring 42 is embedded in the top of the peppermill cap or head 14 below the under surface of the top nut 16. In this regard FIGS. 4 and 4A may be viewed as the plan view and side cross section of the lock ring 42. The complementary radial ribs of the respective irregular surfaces on the bottom of the top nut 16 and the lock ring 42 which is secured to the top of the peppermill cap 14 are spring biased against each other by the captive spring 24 for locking the shaft and head in phase during manual rotation of the head 14.

A further detail of the peppermill illustrated in FIGS. 1 and 5 is the keyed plate 45 which is secured to the bottom of the peppermill cap or head 14 for example by screws. The keyed plate 45 formed with a central hole 46 for receiving the shaft 15 and opposing keyed slots 48 which engages the swaged ears 22 of the shaft 15 when the shaft is in operating position. The complementary projecting ears 22 and keyed slots 48 further serve to maintain the peppermill cap 14 and shaft 15 in phase during manual rotation of the cap.

It is noted that when the shaft 15 is in operating position as illustrated in FIG. 1, retained in that position by top nut 16, the projecting ears 22 of the shaft 15 are at a position above the support ring 30 without resting against the inner rim 34 of support ring 30 therefore preventing wear on the inner rim during manual rotation of the head 14 relative to the base 12. The shaft 15 is biased in a downward direction by the captive spring 24 with the complementary surfaces on the bottom of top nut 16 and on locking ring 42 in locking engagement. Furthermore, the grinding cone 18 is held in the desired position relative to the grinding ring 20 for grinding peppercorns or other condiment pieces to the desired particle size.

Upon disassembly of the peppermill, the top nut 16 is removed and the shaft 15 drops slightly so that the projecting ears 22 rest against the inner rim 34 of support ring 30. As a result the shaft 15 connot slide out and fall away from the peppermill. Furthermore the small drop of the shaft before it is retained by the support ring 30 does not permit the peppercorns or other condiment pieces to fall through the bottom of the peppermill base 12. For final removal of the shaft it is recommended that the head or cap 14 be removed by sliding off the shaft and the top nut 16 replaced on the threaded end 15a. The palm of the hand can then be placed against the top nut 16 for forcibly pressing the swaged ears 22 through support ring by flexibly deforming the inner rim 34 for controlled removal of the shaft. During reassembly the shaft is similarly pressed in the opposite direction passing the projecting ears through the support ring in the opposite direction. The head and top nut are then replaced with the top nut and shaft set at the desired operating position.

While the invention has been described with reference to particular example embodiments it is intended to cover all modifications and equivalents within the scope of the following claims.

We claim:

1. A quick release grinding assembly for a condiment grinder mill having a base for receiving and storing condiment pieces, a head mounted on the base for rotation relative to the base, an elongate shaft extending through the head and base, means securing the shaft to the head for rotation with the head relative to the base, first grinding means mounted on the end of the shaft for positioning in the base, second grinding means mounted in the end of the base in juxtaposition to the first grinding means, said first and second grinding means being constructed and arranged to cooperate and form a grinding mechanism for grinding condiment pieces stored in the base and for discharging ground particles, and a centering device for centering the shaft in the base, the improvement comprising:

said centering device comprising a support ring having an outer perimeter secured to the base and flexing inner perimeter constructed of flexible deformable material, said deformable material having an initial configuration and a memory for substantial return of the inner perimeter to the original configuration after flexing deformation;

said shaft being formed with projecting means extending beyond the width of the shaft providing an overall projecting means span greater than the width of the flexing inner perimeter, said projecting means being constructed and arranged to be forcibly passable through the inner perimeter of the support ring by flexing deformation of the inner perimeter for releasibly assembling the shaft in the mill in an operating position with the first and second grinding means in juxtaposition for grinding condiment pieces, said shaft and first grinding means being releasable from the mill by forcibly passing the shaft and projecting means back through the flexing inner perimeter of the support ring.

2. The quick release grinding assembly of claim 1 further comprising a captive spring secured coaxially around the shaft between an upper washer means slidable on the shaft and lower stop means, said captive spring being positioned along the shaft so that the upper washer is pushed along the shaft by the inner perimeter of the support ring compressing the captive spring and spring biasing the shaft in a downward direction relative to the mill when the shaft is in the operating position in the mill.

3. The quick release grinding assembly of claim 2 wherein the top of the shaft projects above the head of the grinding mill when the shaft is in operating position and further comprising a top nut releasably secured to the top of the shaft, said top nut being formed with a first irregular under surface for bearing against the head and being spring biased by the captive spring against the head for locking the shaft and head in phase during rotation of the head.

4. The quick release grinding assembly of claim 3 wherein the top of the head is formed with a second irregular surface at the top facing the first irregular under surface of the top nut, said first and second irregular surfaces being complementary for locking engagement, said captive spring biasing the first and second irregular surfaces together when the shaft is in operating position for rotation of the shaft and head in phase.

5. The quick release grinding assembly of claim 2 wherein the upper washer bears against the shaft projecting means when the shaft is in a released position or removed from the mill.

6. The quick release grinding assembly of claim 2 wherein the projecting means is positioned at a location along the shaft so that the captive spring bears against the bottom side of the inner perimeter of the support ring and so that the projecting means do not bear against the top side of the inner perimeter when the shaft is in the operating position, said projecting means being close enough to the support ring so that when the projecting means bear against the top side of the inner perimeter of support ring, spacing between the first and second grinding means is still small enough to retain condiment pieces stored in the base.

7. The quick release grinding assembly of claim 2 wherein the support ring is secured to the base by seating against an index edge of the base on one side and with a retaining ring fitted in a groove of the base on the other side of the support ring.

8. The quick release grinding assembly of claim 2 wherein the second grinding means mounted in the end of the base comprises a truncated conical annular grinding ring with the larger diameter downward and wherein the first grinding means mounted on the end of the shaft comprises a truncated grinding cone with the larger diameter downward so that the shaft and grinding cone are inserted and mounted in the base from the bottom of the mill and released through the bottom of the mill.

9. The quick release grinding assembly of claim 1 wherein the projecting means comprises swaged ears on either side of the shaft.

10. The quick release grinding assembly of claim 9 wherein the swaged ears are formed with curved outer surfaces for smoothly engaging and flexing the inner perimeter of the support ring.

11. The quick release grinding assembly of claim 1 further comprising:
   said second grinding means mounted in the end of the base comprising a truncated conical annular grinding ring with the larger diameter downward and said first grinding means comprising a truncated grinding cone with the larger diameter downward so that the shaft and grinding cone are inserted and mounted in the base from the bottom of the mill and released through the bottom of the mill;
   a captive spring secured coaxially around the shaft between an upper washer means slidable on the shaft and lower stop means, said captive spring being positioned along the shaft so that the upper washer is pushed along the shaft by the inner perimeter of the support ring compressing the captive spring and spring biasing the shaft in a downward direction relative to the mill when the shaft is in the operating position in the mill;
   the top of said shaft projecting above the head of the grinding mill when the shaft is in operating position, and a top nut releasibly secured to the top of the shaft, said top nut being formed with a first irregular under surface for bearing against the head, the top of said head being formed with a second irregular surface at the top facing the first irregular surface of the top nut, said first and second irregular surfaces being complementary for locking engagement, said captive spring biasing the first and second irregular surfaces together when the shaft is in operating position for rotation of the shaft and head in phase.

12. The quick release grinding assembly for a condiment grinder mill having a base for receiving condiment pieces, a head mounted on the base for rotation relative to the base, and an elongate shaft extending through the head and base, the improvement comprising:
   a support ring having an outer perimeter mounted in the base and a flexing inner perimeter constructed of flexible deformable material, said deformable material having a memory for return of the inner perimeter to an original configuration after flexing deformation;
   said shaft being formed with projection means extending beyond the width of the shaft, said projection means being constructed and arranged to be forcibly passable through the inner perimeter of the shaft by flexing deformation of the inner perimeter, for releasibly assembling the shaft in the mill in an operating position, said shaft being quickly releasable from the mill by forcibly passing the shaft and projection means back through the flexing inner perimeter of the support ring.

13. The quick release grinding mechanism of claim 12 further comprising a captive spring secured coaxially on the shaft said captive spring being positioned along the shaft so that the support ring compresses the captive spring, spring biasing the shaft in a downward position relative to the mill when the shaft is in the operating position in the mill.

14. The quick release grinding mechanism of claim 13 wherein the top of the shaft projects above the head of the grinding mill when the shaft is in operating position and further comprising top nut means releasibly secured to the top of the shaft, said top nut being formed with a first irregular under surface, and wherein the top of the head is formed with a second irregular surface at the top facing the first irregular under surface of the top nut, said first and second irregular surfaces being complementary for locking engagement, said captive spring biasing the first and second irregular surfaces together when the shaft is in operating position for rotation of the shaft and head in phase.

15. The quick release grinding mechanism of claim 14 wherein the first and second irregular surfaces comprise radial ribs.

16. A grinding assembly for a condiment grinder mill having a base for receiving and storing condiment pieces, a head mounted on the base for rotation relative to the base, an elongate shaft extending through the head and base, means securing the shaft to the head for rotation with the head relative to the base, first grinding means mounted on the end of the shaft for positioning in the base, second grinding means mounted in the end of the base in juxtaposition to the first grinding means, said first and second grinding means being constructed and arranged to cooperate and form a grinding mechanism for grinding condiment pieces stored in the base and for discharging ground particles when the shaft is in operating position, and a centering device for centering the shaft in the base, the improvement comprising:
   a captive spring secured coaxially around the shaft between an upper washer means slidable on the shaft and lower stop means, said captive spring being positioned along the shaft so that the upper washer is pushed along the shaft by the centering device compressing the captive spring and spring biasing the shaft in a downward direction relative to the mill when the shaft is in the operating position in the mill;
   the top of the shaft projecting above the head of the grinding mill when the shaft is in operating position and further comprising a top nut releasibly secured to the top of the shaft, said top nut being formed with a first irregular under surface for bearing against the head;
   the top of the head being formed with a second irregular surface at the top facing the first irregular under-surface of the top nut, said first and second irregular surfaces being complementary for locking engagement, said captive spring biasing the first and second irregular surfaces together when the shaft is in operating position for rotation of the shaft and head in phase.

17. The grinding assembly of claim 16 wherein the first and second irregular surfaces comprise complementary radial ribs.

18. The grinding assembly of claim 16 wherein the second irregular surface at the top of the head comprises a ring or washer secured to the top of the head and formed with the second irregular surface on the exposed side of the ring or washer.

* * * * *